US012784461B2

(12) United States Patent
Yamada et al.

(10) Patent No.: US 12,784,461 B2
(45) Date of Patent: Nov. 3, 2026

(54) VEHICLE CONTROL DEVICE

(71) Applicant: AISIN CORPORATION, Kariya (JP)

(72) Inventors: Ichiji Yamada, Kariya (JP); Akira Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 19/125,362

(22) PCT Filed: Nov. 16, 2023

(86) PCT No.: PCT/JP2023/041248
§ 371 (c)(1),
(2) Date: Apr. 29, 2025

(87) PCT Pub. No.: WO2024/142651
PCT Pub. Date: Jul. 4, 2024

(65) Prior Publication Data

US 2026/0170840 A1 Jun. 18, 2026

(30) Foreign Application Priority Data

Dec. 28, 2022 (JP) ................................ 2022-212317

(51) Int. Cl.
*G06V 20/56* (2022.01)
*B60G 17/018* (2006.01)
(Continued)

(52) U.S. Cl.
CPC ........... *G06V 20/56* (2022.01); *B60G 17/018* (2013.01); *G06V 20/597* (2022.01); *G06V 40/10* (2022.01)

(58) Field of Classification Search
CPC ...... G06V 20/56; G06V 20/597; G06V 40/10; B60G 17/018
(Continued)

(56) References Cited

U.S. PATENT DOCUMENTS

| | | | | |
|---|---|---|---|---|
| 9,371,072 | B1 * | 6/2016 | Sisbot | G06V 20/58 |
| 2020/0089250 | A1 * | 3/2020 | Marble | B60Q 9/00 |
| 2025/0276645 | A1 * | 9/2025 | Herbst | G06F 9/4881 |

FOREIGN PATENT DOCUMENTS

| | | | |
|---|---|---|---|
| JP | 2020-001519 | A | 1/2020 |
| JP | 2020-029210 | A | 2/2020 |
| JP | 2020-185973 | A | 11/2020 |

OTHER PUBLICATIONS

Katsura et al., "Intracerebral Mechanism of Reinforcement Learning and Meta Learning Basal ganglia and neuromodulator systems", ATR Human Information Science Laboratory, 2002, vol. 6, No. 1, pp. 36-40.

(Continued)

*Primary Examiner* — Yi-Kai Wang
(74) *Attorney, Agent, or Firm* — Sughrue Mion, PLLC

(57) ABSTRACT

A vehicle control device including: an acquisition unit acquiring, from a camera that images a surrounding of a vehicle and inside of a vehicle compartment, a surrounding image of the vehicle and an image of an occupant in the vehicle compartment; a first estimation unit estimating vibration applied to the vehicle based on the surrounding image, the vibration including a vertical component; a second estimation unit estimating vibration of the occupant with respect to the vehicle based on the image of the occupant, the vibration including a vertical component; a calculation unit calculating vibration applied to the occupant by adding the vibration of the occupant with respect to the vehicle to the vibration applied to the vehicle; and a generation unit generating a signal to be output to a vibration control device that controls the vibration applied to the occupant, the signal based on the vibration applied to the occupant.

4 Claims, 9 Drawing Sheets

(51) Int. Cl.
*G06V 20/59* (2022.01)
*G06V 40/10* (2022.01)
(58) Field of Classification Search
USPC .............................................................. 701/37
See application file for complete search history.

(56) References Cited

OTHER PUBLICATIONS

International Search Report of PCT/JP2023/041248 dated Dec. 19, 2023.

* cited by examiner

| INDEX | METHOD FOR ESTIMATING COMFORT OR DISCOMFORT |
|---|---|
| HEARTBEAT | WHEN COMFORTABLE, LF/HF RATIO DECREASES |
| BREATHING | WHEN FATIGUED OR DISCOMFORT, INCREASES |
| PULSE | WHEN COMFORTABLE, LF/HF RATIO DECREASES |
| BLINKING | WHEN FATIGUED OR DISCOMFORT, INCREASES |

FIG. 8

| PART \ ATTRIBUTE | MALE | FEMALE | ELDERLY PERSON | INFANT |
|---|---|---|---|---|
| HEAD | VIBRATION CHARACTERISTIC A | VIBRATION CHARACTERISTIC E | VIBRATION CHARACTERISTIC I | VIBRATION CHARACTERISTIC M |
| CHEST | VIBRATION CHARACTERISTIC B | VIBRATION CHARACTERISTIC F | VIBRATION CHARACTERISTIC J | VIBRATION CHARACTERISTIC N |
| ABDOMEN | VIBRATION CHARACTERISTIC C | VIBRATION CHARACTERISTIC G | VIBRATION CHARACTERISTIC K | VIBRATION CHARACTERISTIC O |
| LEG | VIBRATION CHARACTERISTIC D | VIBRATION CHARACTERISTIC H | VIBRATION CHARACTERISTIC L | VIBRATION CHARACTERISTIC P |

* BMI HIGH/LOW

VEHICLE CONTROL DEVICE

CROSS-REFERENCE TO RELATED APPLICATIONS

This is a National Stage of International Application No. PCT/JP2023/041248 filed Nov. 16, 2023, claiming priority based on Japanese Patent Application No. 2022-212317 Dec. 28, 2022.

TECHNICAL FIELD

This disclosure relates to a vehicle control device.

BACKGROUND ART

In order to prevent vibration of a vehicle, a technique of estimating a state quantity such as an acceleration applied to an occupant using an acceleration sensor provided in the vehicle is known. In the technique of PTL 1 described above, an image of an inner camera provided in a vehicle compartment is used to more accurately grasp the state quantity of the occupant. In the technique of PTL 2 described above, an age of the occupant is estimated based on image information of an inner camera, and driving control is performed according to the age.

CITATION LIST

Patent Literature

PTL 1: JP2020-001519A
PTL 2: JP2020-029210A

SUMMARY OF THE DISCLOSURE

Technical Problem

However, an in-vehicle acceleration sensor is usually fixed to a vehicle body, and it is difficult to accurately estimate a state quantity of an occupant seated in a seat provided with a spring. On the other hand, in the above-described PTL 1 in which the state quantity of the occupant is estimated using the inner camera, only the state quantity of the occupant with respect to the vehicle can be known, and substantial vibration of the occupant in consideration of the vibration of the vehicle cannot be grasped.

Not only attributes such as an age of an occupant but also a resonance point in each body part and a vibration level at which discomfort is felt at a specific part are different, and it is difficult to obtain a state satisfying many occupants in PTL 2 described above.

Solution to Problem

A vehicle control device according to an embodiment includes: an acquisition unit configured to acquire, from a camera that images a surrounding of a vehicle and inside of a vehicle compartment, a surrounding image of the vehicle and an image of an occupant in the vehicle compartment; a first estimation unit configured to estimate vibration applied to the vehicle based on the surrounding image, the vibration including at least a vertical component; a second estimation unit configured to estimate vibration of the occupant with respect to the vehicle based on the image of the occupant, the vibration including at least a vertical component; a calculation unit configured to calculate vibration applied to the occupant by adding the vibration of the occupant with respect to the vehicle to the vibration applied to the vehicle; and a generation unit configured to generate a signal to be output to a vibration control device that controls the vibration applied to the occupant, the signal being based on the vibration applied to the occupant.

Advantageous Effects of Various Aspects of the Disclosure

According to the embodiment of the disclosure, it is possible to estimate vibration applied to the occupant using a simple configuration and prevent the vibration that causes the occupant to feel discomfort.

BRIEF DESCRIPTION OF DRAWINGS

FIG. 8 is a diagram showing an example of vibration characteristic data given in advance to the vehicle control device according to the embodiment.

DESCRIPTION OF EMBODIMENTS

Figure 1:
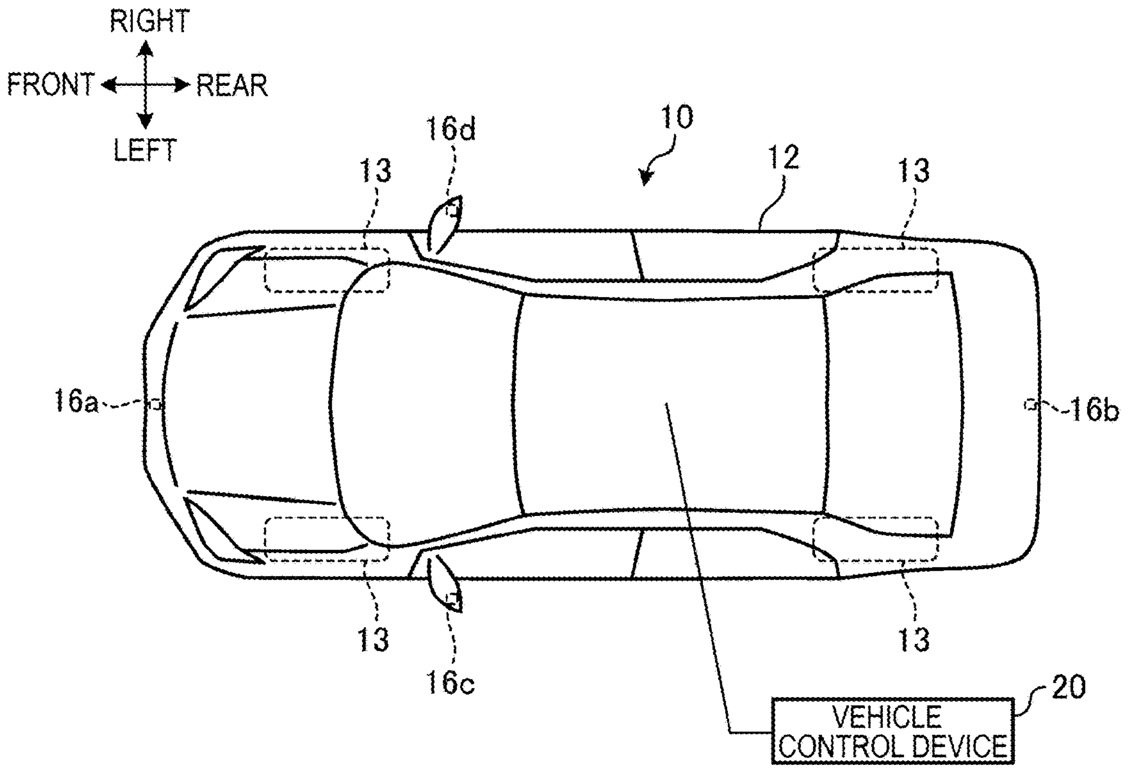
FIG. 1 is a top view of a vehicle equipped with a vehicle control device according to an embodiment.

Components similar to those of the following exemplary embodiment and the like are denoted by the same reference numerals, and redundant description thereof will be appropriately omitted.

Configuration Example of Vehicle

Figure 2:
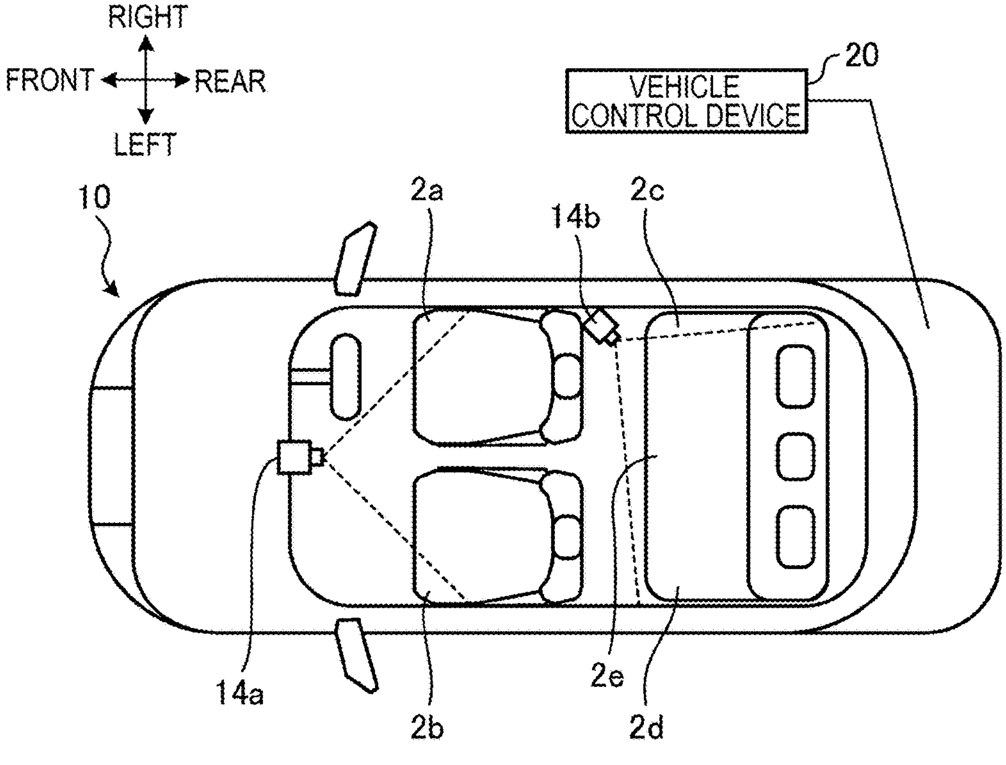
FIG. 2 is a perspective view of a vehicle compartment of the vehicle equipped with the vehicle control device according to the embodiment, as viewed from above.

FIG. 1 is a top view of a vehicle 10 equipped with a vehicle control device 20 according to an embodiment. In FIG. 1, illustration and description of some configurations described later in FIG. 2 are omitted. The front, rear, left, and right of the vehicle 10 in FIG. 1 and FIG. 2 described later indicate directions when viewed from a driver seat of the vehicle 10.

The vehicle 10 according to the embodiment may be, for example, an internal combustion engine automatic vehicle using an internal combustion engine as a drive source, may be an electric automatic vehicle or a fuel cell automatic vehicle using an electric motor as a drive source, or may be a hybrid automatic vehicle using both of the internal combustion engine and the electric motor as a drive source.

The vehicle 10 can be equipped with various transmission devices, and can also be equipped with various devices such as systems and components necessary for driving the internal combustion engine or the electric motor. A system, the number, a layout, and the like of devices related to driving of wheels 13 of the vehicle 10 can be set in various manners.

As shown in FIG. 1, the vehicle 10 includes a vehicle body 12, a plurality of wheels 13, and a plurality of outer cameras 16*a* to 16*d*. When it is not necessary to distinguish the individual outer cameras 16*a* to 16*d*, they are simply referred to as outer cameras 16.

The vehicle body 12 forms a vehicle compartment in which an occupant enters. The plurality of wheels 13 and the plurality of outer cameras 16 are attached to the vehicle body 12. In the example of FIG. 1, the vehicle body 12 includes the four wheels 13 and the four outer cameras 16. However, the number of the outer cameras 16 attached to the vehicle body 12 is free.

The four wheels 13 are provided on the front, rear, left, and right sides of the vehicle body 12. The two front wheels 13 function, for example, as steering wheels, and the two rear wheels 13 function, for example, as driving wheels.

The outer camera 16 is, for example, a digital camera including an imaging element such as a charge coupled device (CCD) or a CMOS image sensor (CIS). The outer camera 16 generates a moving image including a plurality of frame images captured at a predetermined frame rate or a captured image of a still picture.

The outer camera 16 is provided on an outer peripheral portion of the vehicle body 12, has a wide-angle lens or a fisheye lens, and can capture, for example, a range of 140° to 190° in a horizontal direction. An optical axis of the outer camera 16 is set obliquely downward.

Accordingly, the outer camera 16 collects a surrounding image obtained by imaging a surrounding of the vehicle 10 including a road surface and outputs the surrounding image to the vehicle control device 20. The vehicle control device 20 can detect, based on the surrounding image collected by the outer camera 16, vibration applied to the vehicle 10 traveling on the road surface and the like.

The outer camera 16*a* is provided at a central portion in a left-right direction of a front end portion of the vehicle body 12, for example, is provided on a front bumper. The outer camera 16*a* collects a captured image obtained by imaging the front of the vehicle 10 as a surrounding image. The outer camera 16*b* is provided at a central portion in the left-right direction of a rear end portion of the vehicle body 12, for example, is provided on a rear bumper. The outer camera 16*b* collects a captured image obtained by imaging the rear of the vehicle 10 as a surrounding image.

The outer camera 16*c* is provided at a central portion in a front-rear direction of a left end portion of the vehicle body 12, for example, is provided on a left side mirror. The outer camera 16*c* collects a captured image obtained by imaging the left of the vehicle 10 as a surrounding image. The outer camera 16*d* is provided at a central portion in the front-rear direction of a right end portion of the vehicle body 12, for example, is provided on a right side mirror. The outer camera 16*d* collects a captured image obtained by imaging the right periphery of the vehicle 10 as a surrounding image.

FIG. 2 is a perspective view of the vehicle compartment of the vehicle 10 equipped with the vehicle control device 20 according to the embodiment, as viewed from above. In FIG. 2, some configurations described above in FIG. 1 are omitted.

As shown in FIG. 2, a plurality of seats 2*a* to 2*e* and a plurality of inner cameras 14*a* and 14*b* are provided in the vehicle compartment of the vehicle 10. When it is not necessary to distinguish the individual seats 2*a* to 2*e* from each other, the seats 2*a* to 2*e* are simply referred to as seats 2, and when it is not necessary to distinguish the individual inner cameras 14*a* and 14*b* from each other, the inner cameras 14*a* and 14*b* are simply referred to as inner cameras 14.

Among the plurality of seats 2*a* to 2*e*, the driver seat 2*a* and the passenger seat 2*b* are provided on a front side in the vehicle compartment, and the plurality of rear seats 2*c* to 2*e* are provided on a rear side. In the example of FIG. 2, as described above, a total of five seats 2*a* to 2*e* are provided in the vehicle compartment. However, the number of seats 2 provided in the vehicle compartment is free.

Among the plurality of rear seats 2*c* to 2*e*, the rear seat 2*c* is provided behind the driver seat 2*a*, the rear seat 2*d* is provided behind the passenger seat 2*b*, and the rear seat 2*e* is provided between the rear seat 2*c* and the rear seat 2*d*. In the example of FIG. 2, the plurality of rear seats 2*c* to 2*e* are so-called bench seat type seats whose seating surfaces are continuous with each other. However, the rear seats 2*c* to 2*e* may be independently provided, for example, similarly to the driver seat 2*a* and the passenger seat 2*b*.

Similarly to the outer camera 16 described above, the inner camera 14 is a digital camera including an imaging element such as a CCD or a CIS. The inner camera 14 also generates a moving image including a plurality of frame images captured at a predetermined frame rate or a captured image of a still picture.

The inner camera 14 is provided in the vehicle compartment, collects an occupant image obtained by imaging the occupant in the vehicle compartment, and outputs the occupant image to the vehicle control device 20. The vehicle control device 20 can detect vibration of the occupant with respect to the vehicle 10 based on the occupant image collected by the inner camera 14.

Of the inner cameras 14*a* and 14*b*, the inner camera 14*a* is disposed at a position where the inner camera 14*a* can image an occupant on the front side of the vehicle compartment. The inner camera 14*a* collects, as occupant images, at least captured images of an occupant seated in the driver seat 2*a* and an occupant seated in the passenger seat 2*b*.

Of the inner cameras 14*a* and 14*b*, the inner camera 14*b* is disposed at a position where the inner camera 14*b* can image an occupant on the rear side of the vehicle compartment. The inner camera 14*b* collects, as occupant images, at least captured images of occupants seated in the rear seats 2*c* to 2*e*.

In the example of FIG. 2, as described above, the two inner cameras 14*a* and 14*b* are provided in the vehicle compartment. However, the number of inner cameras 14 provided in the vehicle compartment is free.

Regardless of the example of FIG. 2, when the vehicle 10 is a bus type vehicle and the like capable of transporting a large number of occupants, not only the occupant sitting on any seat but also an occupant standing on the vehicle or an occupant in a state sitting on a wheelchair and the like can be imaged by the inner camera 14.

The vehicle control device 20 according to the embodiment calculates net vibration applied to the occupant of the vehicle 10 based on the images captured by the outer camera 16 and the inner camera 14 described above. The vehicle control device 20 controls each part of the vehicle 10 based on the calculated net vibration to prevent the vibration that causes the occupant to feel discomfort.

Configuration Example of Vehicle Control System

Figure 3:
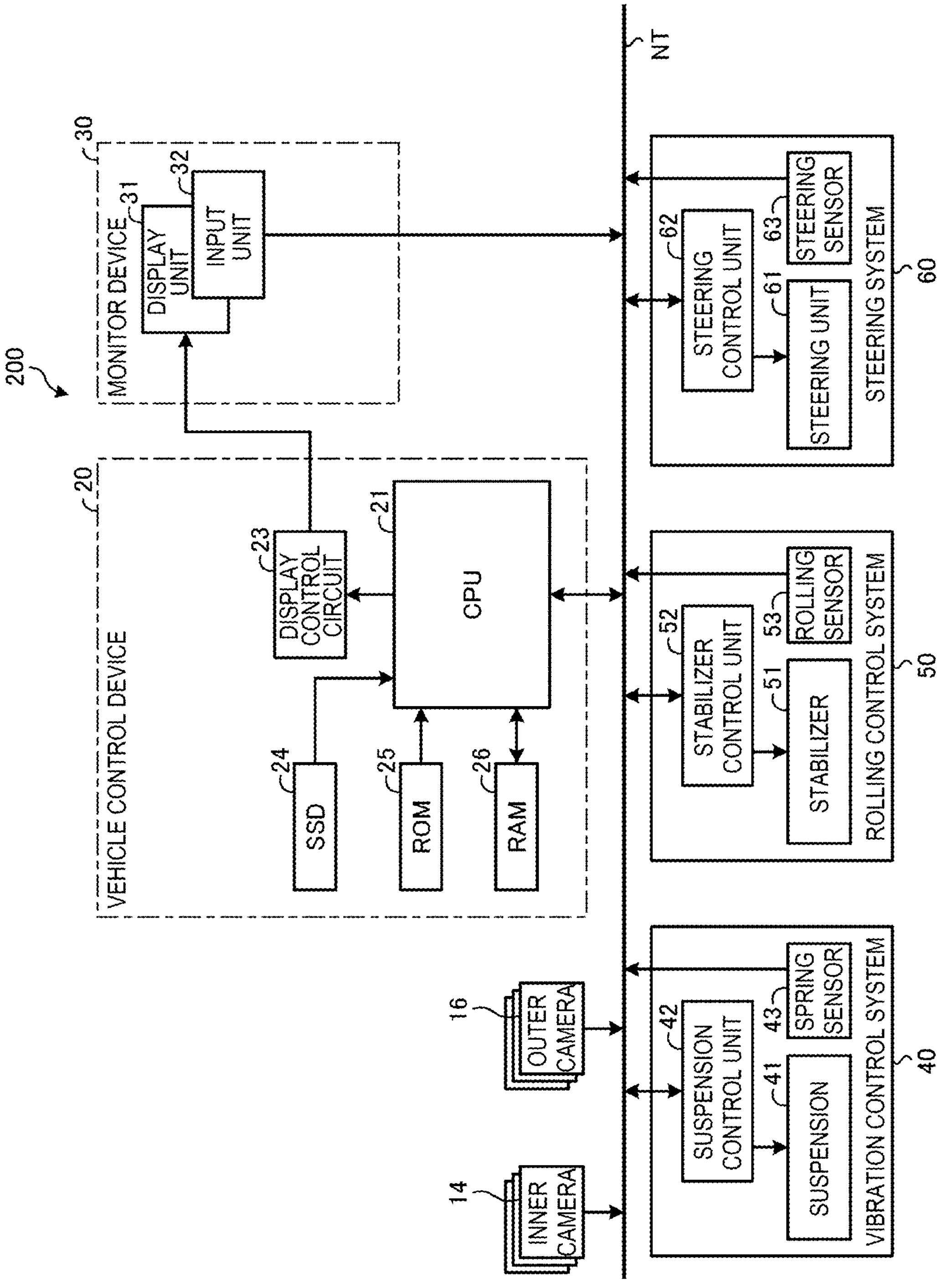
FIG. 3 is a block diagram showing an example of an overall configuration of a vehicle control system according to the embodiment.

FIG. 3 is a block diagram showing an example of an overall configuration of a vehicle control system 200 according to the embodiment.

As shown in FIG. 3, the vehicle control system 200 includes the vehicle control device 20, a monitor device 30, a vibration control system 40, a rolling control system 50, a steering system 60, the inner cameras 14, and the outer cameras 16. These components are connected to one another via an in-vehicle network NT such that information can be transmitted and received therebetween.

The in-vehicle network NT includes, for example, a controller area network (CAN) and a local interconnect network (LIN). The in-vehicle network NT may be provided in a part of the vehicle control system 200.

The vehicle control device 20 is implemented by a microcomputer such as an electronic control unit (ECU), and performs control including vibration control on each unit of the vehicle 10.

The vehicle control device 20 includes a central processing unit (CPU) 21, a display control circuit 23, a solid state drive (SSD) 24, a read only memory (ROM) 25, and a random access memory (RAM) 26. The CPU 21, the ROM 25, and the RAM 26 may be integrated in the same package.

The CPU 21 is an example of a hardware processor, reads a program stored in a non-volatile storage device such as the ROM 25, and executes various types of calculation processing and control according to the program.

The ROM 25 stores various programs and parameters necessary for executing the programs. The RAM 26 temporarily stores various types of data used in the calculations performed by the CPU 21. The SSD 24 is a rewritable non-volatile storage device, and maintains data even when a power of the vehicle control device 20 is turned off.

The display control circuit 23 generates various types of data to be displayed on a display unit 31 described later provided in the monitor device 30.

The vibration control system 40 includes a suspension 41, a suspension control unit 42, and a spring sensor 43, and mainly prevents vibration of a vertical component of the vehicle 10. The vibration control system 40 is an example of a vibration control device.

The suspension 41 is a device including, for example, a suspension arm that supports an axle, a spring that absorbs an impact applied to the wheels 13 and the like, and a shock absorber that damps shaking of the vehicle body 12 caused by expansion and contraction of the spring, and alleviates the vibration of the vehicle 10. The suspension control unit 42 is, for example, a microcomputer including a hardware processor such as a CPU. The suspension control unit 42 controls a spring constant of the spring provided in the suspension 41, a damping force of the shock absorber, and the like based on a detection result and the like of the spring sensor 43. The spring sensor 43 detects, for example, the expansion and contraction of the spring provided in the suspension 41.

However, the spring sensor 43 of the suspension 41 may be replaced with the outer camera 16 described above. According to the image captured by the outer camera 16, since an inclination of the vehicle body 12 can be detected, an expansion and contraction amount of the spring geometrically disposed in the suspension 41 can also be estimated based on the image of the outer camera 16.

The rolling control system 50 includes a stabilizer 51, a stabilizer control unit 52, and a rolling sensor 53, and mainly prevents vibration of a horizontal component of the vehicle 10. The rolling control system 50 is an example of a vibration control device.

The stabilizer 51 is a device including, for example, a connection component added to the suspension 41, and corrects an inclination of the axle of the vehicle 10. The stabilizer control unit 52 is, for example, a microcomputer including a hardware processor such as a CPU. The stabilizer control unit 52 controls the stabilizer 51 based on a detection result and the like of the rolling sensor 53. The rolling sensor 53 is, for example, a position sensor such as an acceleration sensor, and detects rolling of the vehicle 10.

However, the rolling sensor 53 of the stabilizer 51 may be replaced with the outer camera 16 described above. According to the image captured by the outer camera 16, rolling of the vehicle body 12 can also be detected.

The steering system 60 includes a steering unit 61, a steering control unit 62, and a steering sensor 63, and controls a traveling direction of the vehicle 10. The steering system 60 is an example of a vibration control device.

The steering unit 61 is a device including, for example, a handle or a steering wheel, and steers the steering wheels of the vehicle 10 to steer the traveling direction of the vehicle 10. The steering control unit 62 is, for example, a microcomputer including a hardware processor such as a CPU. The steering control unit 62 controls the traveling direction of the vehicle 10 based on an operation of the handle, the steering wheel, or the like by a driver. The steering sensor 63 is an angle sensor including, for example, a Hall element, and detects a steering angle that is a rotation angle of the steering unit 61.

The monitor device 30 is provided on an instrument panel and the like in the vehicle compartment of the vehicle 10, and includes the display unit 31 and an input unit 32.

The display unit 31 is a display device such as a liquid crystal display (LCD) or an organic electroluminescent display (OELD). The display unit 31 displays, for example, a screen based on image data acquired by the vehicle control device 20 from the outer camera 16, a screen for presenting information to the occupant, and a screen for receiving various operation instructions from the occupant.

The input unit 32 is, for example, a touch panel provided on a display screen of the display unit 31. The input unit 32 can transmit a content displayed on the display screen by the display unit 31. Accordingly, the input unit 32 can cause the occupant to visually recognize the display content of the display unit 31.

The input unit 32 receives an instruction input by the driver and the like touching a position corresponding to the display content of the display unit 31, and transmits the instruction to the vehicle control device 20 via the in-vehicle network NT. The input unit 32 is not limited to the touch panel, and may be a hardware switch of a push button type and the like.

Figure 4:
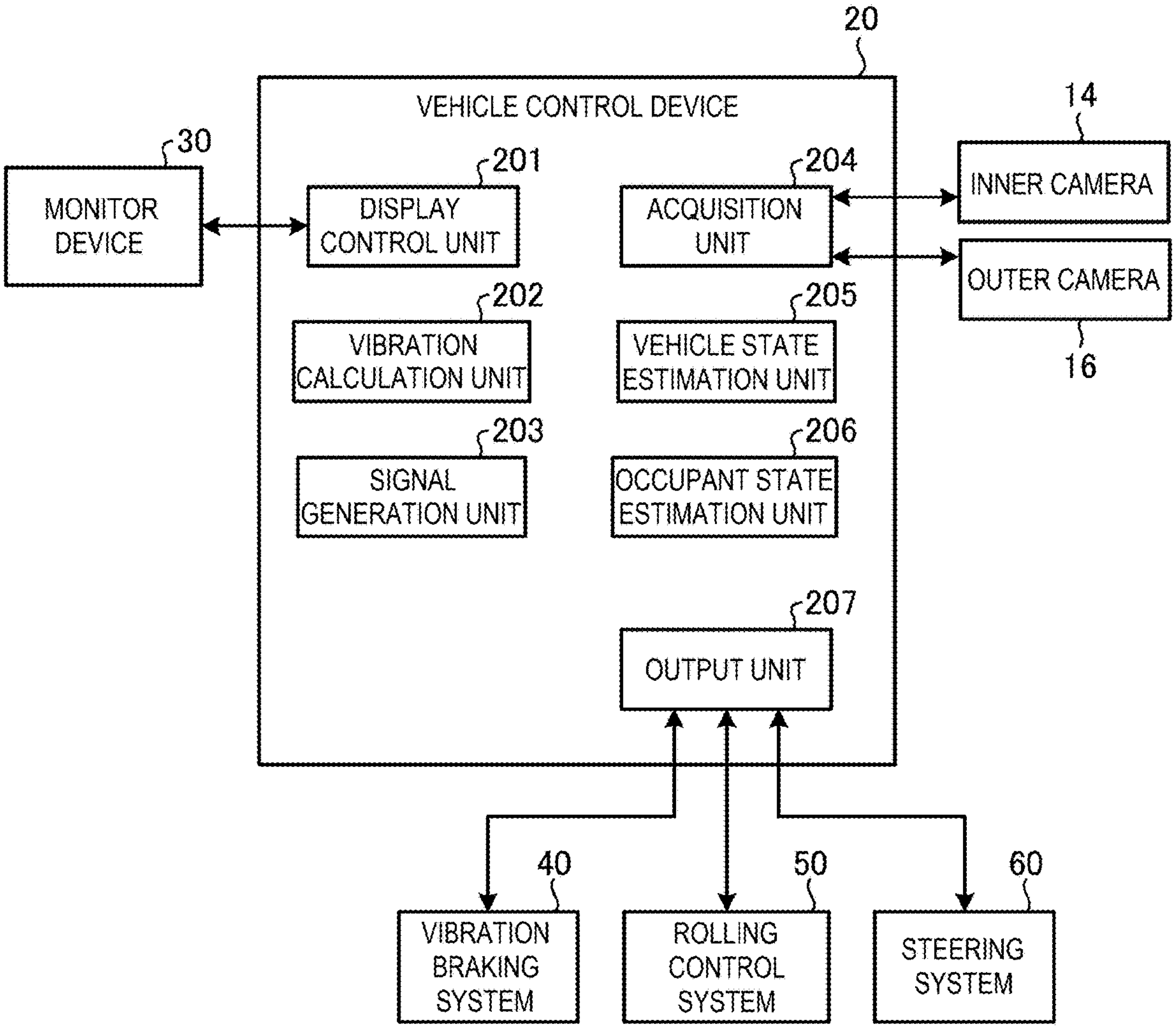
FIG. 4 is a block diagram showing an example of a functional configuration of the vehicle control device according to the embodiment.

FIG. 4 is a block diagram showing an example of a functional configuration of the vehicle control device 20 according to the embodiment. As shown in FIG. 4, the vehicle control device 20 includes a display control unit 201, a vibration calculation unit 202, a signal generation unit 203, an acquisition unit 204, a vehicle state estimation unit 205, an occupant state estimation unit 206, and an output unit 207 as functional units.

These functional units are implemented, for example, by the above-described CPU 21 reading the program stored in the storage device such as the ROM 25, and executing the program. Alternatively, these functional units are implemented by the display control circuit 23 and the like operating under the control of the CPU 21 according to the program.

A part or all of the functional units may be implemented by hardware such as a circuit including an application specific integrated circuit (ASIC).

The display control unit 201 generates a content to be displayed on the display unit 31 of the monitor device 30 and causes the display unit 31 to display the content.

The acquisition unit 204 acquires a captured image of the surrounding of the vehicle 10 from the outer camera 16 as a surrounding image of the vehicle 10. The acquisition unit 204 acquires a captured image of the vehicle compartment from the inner camera 14 as an occupant image of the vehicle compartment.

The vehicle state estimation unit 205 as a first estimation unit estimates vibration applied to the vehicle 10 traveling on the road surface and the like, based on the surrounding image acquired by the acquisition unit 204.

Examples of the vibration applied to the vehicle 10 due to a road surface condition and the like include vertical movement (pitch) which is the vibration of the vertical component, rolling (roll) which is the vibration of the horizontal component, and lifting (heave) of the vehicle body 12. The vehicle state estimation unit 205 specifies at least the vibration of the vertical component among these. However, it is preferable that the vehicle state estimation unit 205 can specify not only the vertical component but also the horizontal component and other general vibrations in each direction.

The vehicle state estimation unit 205 can estimate such vibration of the vehicle 10 based on undulation and a step of the road surface appearing in the surrounding image and comparison with a surrounding scenery. Here, the vibration estimated by the vehicle state estimation unit 205 can also be referred to as a vibration acceleration.

The vehicle state estimation unit 205 may estimate the vibration of the vehicle 10 at an arrangement position of each of the outer cameras 16*a* to 16*d* based on the captured images acquired from the plurality of outer cameras 16*a* to 16*d*.

The occupant state estimation unit 206 as a second estimation unit estimates a position of the occupant in the vehicle 10, an attribute of the occupant, a state of the occupant, and the vibration of the occupant with respect to the vehicle 10 based on the occupant image acquired by the acquisition unit 204.

Specifically, the occupant state estimation unit 206 can estimate a position of the occupant in the vehicle compartment based on a position of the occupant reflected in the captured images by the inner cameras 14*a* and 14*b*. When the vehicle 10 is a bus-type vehicle and the like capable of transferring a large number of occupants, the occupant state estimation unit 206 may estimate whether the occupant is in a state of standing or sitting, or whether the occupant is sitting on a wheelchair and the like.

The occupant state estimation unit 206 can estimate attributes such as a gender, an age, and a physique of the occupant based on a face image, a whole body image, and the like of the occupant reflected in the inner cameras 14*a* and 14*b*.

The occupant state estimation unit 206 can detect heartbeat, breathing, and the like of the occupant based on movement of a chest of the occupant reflected in the inner cameras 14*a* and 14*b*. The occupant state estimation unit 206 can estimate a state of the occupant such as a fatigue degree and a discomfort degree of the occupant based on the detected heartbeat and breathing and a behavior such as blinking of the occupant reflected in the inner cameras 14*a* and 14*b*.

The inner camera 14 is attached to a partial structure of the vehicle body 12 in the vehicle compartment. Therefore, it can be said that the vibration of the vehicle 10 and vibration of the inner camera 14 are substantially synchronized. Therefore, by analyzing the captured image from the inner camera 14, the vibration of the occupant with respect to the vehicle 10 is estimated by subtracting the vibration applied to the vehicle 10. Here, the vibration estimated by the occupant state estimation unit 206 can also be referred to as a vibration acceleration.

The occupant state estimation unit 206 may estimate the vibration of each of the occupants reflected in the plurality of inner cameras 14*a* and 14*b* with respect to the vehicle 10. The occupant state estimation unit 206 may estimate, for a plurality of parts including at least one of a head, a chest, an abdomen, a leg, and the like of each occupant, vibration of the body parts with respect to the vehicle 10.

As described above, the occupant state estimation unit 206 can estimate, based on the image of the inner camera 14, not only the vibration of the occupant with respect to the vehicle 10 but also a state including a three-dimensional position of the occupant in the vehicle compartment, vital signs of the occupant, and the like.

The vibration calculation unit 202 calculates the vibration applied to the occupant based on the vibration of the vehicle 10 estimated by the vehicle state estimation unit 205 and the vibration of the occupant estimated by the occupant state estimation unit 206. That is, the vibration applied to the occupant is obtained by adding the vibration of the occupant with respect to the vehicle 10 to the vibration applied to the vehicle 10, and is net vibration substantially applied to the occupant. Here, the vibration calculated by the vibration calculation unit 202 can also be referred to as a vibration acceleration.

The vibration calculation unit 202 may calculate vibration applied to each occupant of the vehicle 10. At this time, the vibration calculation unit 202 can calculate the vibration applied to each occupant by associating the vibration of the vehicle 10 at the arrangement position of each of the outer cameras 16*a* to 16*d* with the position of each occupant in the vehicle 10 reflected in the plurality of inner cameras 14*a* and 14*b*.

The vibration calculation unit 202 may individually calculate, for the plurality of parts including at least one of the head, the chest, the abdomen, the leg, and the like of the occupant, vibration applied to the body parts.

The signal generation unit 203 generates, based on the vibration applied to the occupant, a signal for causing at least one of the vibration control system 40, the rolling control system 50, and the steering system 60 to perform control for preventing vibration that causes the occupant to feel discomfort.

That is, for example, the signal for the vibration control system 40 may be a control signal that causes the suspension control unit 42 of the vibration control system 40 to control at least one of the spring constant of the spring provided in the suspension 41 and the damping force of the shock absorber.

For example, the signal for the rolling control system 50 may be a control signal that causes the stabilizer control unit 52 of the rolling control system 50 to control the stabilizer 51.

Further, for example, the signal for the steering system 60 can be a control signal for causing the steering control unit 62 of the steering system 60 to control rear wheels that is the driving wheels among the plurality of wheels 13.

The signal generation unit 203 may generate, for each of the plurality of occupants, a signal for performing control to reduce average discomfort of all the occupants when the vibration applied to the occupants is calculated. Alternatively, the signal generation unit 203 may generate a signal for preventing vibration of an occupant, to which the largest discomfort vibration is applied, among the plurality of occupants.

The signal generation unit 203 may generate, for the plurality of body parts of each occupant, a signal for performing control to reduce average discomfort of the body parts when the vibration applied to the plurality of body parts is calculated.

Alternatively, the signal generation unit 203 may generate a signal for preventing vibration of a body part that is more likely to cause discomfort, such as the head or the abdomen among the plurality of parts. In this case, as a head position of the occupant, for example, vibration at a headrest position may be controlled. As chest and abdomen positions of the occupant, for example, vibration of a seat position may be controlled. As the leg of the occupant, for example, vibration of a floor position may be controlled.

As described above, it may be set in advance in the vehicle control unit 20 which of all the occupants, the occupant or the body part to be prioritized, and the like is targeted to perform the control for preventing the discomfort vibration.

Here, what kind of frequency and intensity of vibration causes the occupant to feel discomfort may differ depending on the attributes and body parts of the occupant. This is because a muscle strength that supports a body, a weight per muscle fiber, a resonance frequency of the entire body, and the like differ depending on whether the occupant is a male or a female, whether the occupant is an infant or an elderly person, or whether the physique is good or skinny. Similarly, since the muscle strength supporting the body parts such as the head, the chest, the abdomen, and the leg of the occupant, a mass of these parts per muscle fiber, a resonance frequency in each of the body parts, and the like are different, a vibration frequency, a vibration intensity, and the like at which discomfort is felt are also different depending on the body parts.

Therefore, based on the attributes of the occupant estimated by the occupant state estimation unit 206 and the vibration applied to each of the plurality of body parts, the signal generation unit 203 may generate a signal for performing control to reduce the discomfort degree due to the vibration in consideration of each occupant and each body part of the occupant.

Such a signal can be generated, for example, by holding in advance data on vibration characteristics such as a vibration frequency at which the occupant feels discomfort for each attribute and body part of the occupant. That is, the signal generation unit 203 can generate, by referring to the vibration characteristic data, the control signal such that the vibration frequency and the like applied to the occupant approaches an appropriate state.

The output unit 207 outputs the signal generated by the signal generation unit 203 to a target system among the vibration control system 40, the rolling control system 50, and the steering system 60.

The vibration control system 40, the rolling control system 50, and the steering system 60 control each unit in the system according to the signal from the vehicle control device 20. Accordingly, the vibration of the vehicle 10 that causes the occupant to feel discomfort is prevented.

Functional Example of Vehicle Control Device

Next, a more detailed functional example of the vehicle control device 20 according to the embodiment will be described with reference to FIGS. 5 to 8.

Figure 5:
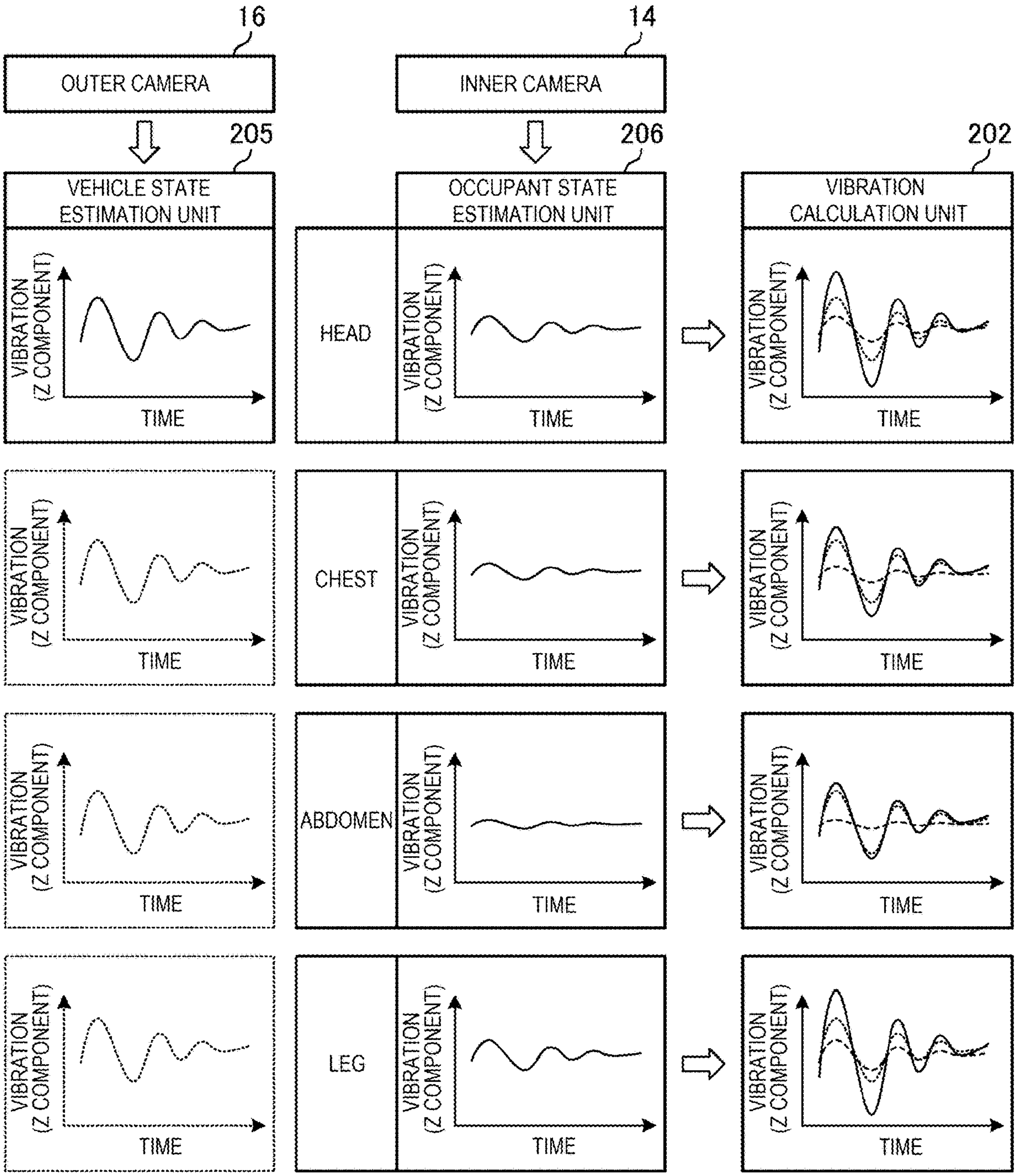
FIG. 5 is a diagram showing an example in which the vehicle control device according to the embodiment calculates vibration applied to an occupant based on vibration applied to the vehicle and vibration of the occupant with respect to the vehicle.

FIG. 5 is a diagram showing an example in which the vehicle control device 20 according to the embodiment calculates the vibration applied to the occupant based on the vibration applied to the vehicle 10 and the vibration of the occupant with respect to the vehicle 10.

As shown in FIG. 5, the vehicle state estimation unit 205 of the vehicle control device 20 estimates the vibration applied to the vehicle 10 based on the surrounding image acquired from the outer camera 16. The vibration applied to the vehicle 10 is obtained, for example, as a graph showing a temporal change in the magnitude of the vibration.

The example of FIG. 5 shows a graph in which an amplitude of the vibration of the vertical component among the vibration applied to the vehicle 10 is drawn. However, as described above, in addition to the vibration of the vertical component, vibration in various other directions may be estimated.

The occupant state estimation unit 206 of the vehicle control device 20 estimates the vibration of the occupant with respect to the vehicle 10 based on the occupant image acquired from the inner camera 14. Similarly to the vibration applied to the vehicle 10, the vibration of the occupant with respect to the vehicle 10 is obtained as, for example, a graph indicating a temporal change in the magnitude of the vibration.

The example of FIG. 5 shows a graph in which amplitudes of vibration of vertical components applied to the head, the chest, the abdomen, and the leg of the occupant among the vibration of the occupant with respect to the vehicle 10 are drawn. However, as described above, in addition to the vibration of the vertical component, vibration in various other directions may be estimated.

The vibration calculation unit 202 of the vehicle control device 20 adds the vibration applied to the vehicle 10 estimated by the vehicle state estimation unit 205 and the vibration of each part of the occupant with respect to the vehicle 10 estimated by the occupant state estimation unit 206.

That is, the vibration applied to the vehicle 10 and the vibration of the head of the occupant with respect to the vehicle 10 are added to calculate vibration substantially applied to the head of the occupant. The vibration applied to the vehicle 10 and the vibration of the chest of the occupant with respect to the vehicle 10 are added to calculate vibration substantially applied to the chest of the occupant. The vibration applied to the vehicle 10 and the vibration of the abdomen of the occupant with respect to the vehicle 10 are added to calculate vibration substantially applied to the abdomen of the occupant. The vibration applied to the vehicle 10 and the vibration of the leg of the occupant with respect to the vehicle 10 are added to calculate vibration substantially applied to the leg of the occupant.

At this time, the vibration of the vehicle 10 added to the vibration of each part is common for one occupant.

The vehicle control device 20 can calculate the substantial vibration of each body part of the occupant shown in FIG. 5 for each occupant in the vehicle compartment. At this time, when the vehicle state estimation unit 205 estimates vibration of the vehicle 10 applied to a position of an occupant in the vehicle 10 for each position of the occupant in the vehicle 10, the vibration of the vehicle 10 corresponding to the position of the occupant in the vehicle 10 can be added for each occupant.

As described above, the occupant state estimation unit 206 according to the embodiment estimates the attribute and the state of the occupant in addition to the vibration of the occupant with respect to the vehicle 10. The signal generation unit 203 generates, based on, for example, the data on the vibration characteristics for each attribute and body part of the occupant, a signal for preventing vibration that causes the occupant to feel discomfort.

An algorithm that enables such complicated control can be constructed using, for example, machine learning. Among various methods of machine learning, for example, reinforcement learning is preferably used to construct such an algorithm. Hereinafter, as an example of a method for constructing an algorithm that the vehicle control device 20 of the embodiment follows, a case where an actor-critic scheme is used as a reinforcement learning algorithm will be described as an example.

In such reinforcement learning, it can be assumed that various vital signs, behaviors, and the like such as heartbeat, breathing, pulse, and blinking can be detected from the occupant image of the inner camera 14, and various states of the occupant can be estimated based on these vital signs and behaviors.

Figures 6, 7:
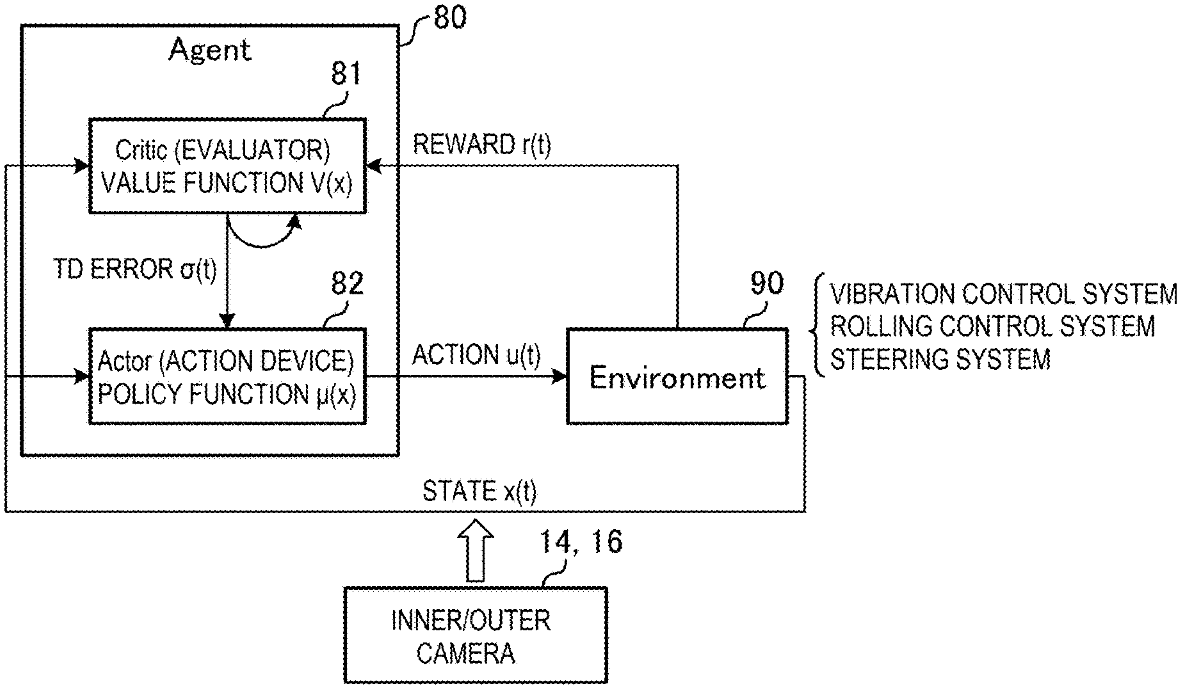
FIG. 6 is a diagram showing some examples of a state of the occupant that can be estimated based on an image captured by an inner camera according to the embodiment.
FIG. 7 is a diagram showing an example in which an algorithm that the vehicle control device according to the embodiment follows, is constructed by reinforcement learning.

FIG. 6 is a diagram showing some examples of a state of the occupant that can be estimated based on the image captured by the inner camera 14 according to the embodiment.

As shown in FIG. 6, there are a low frequency (LF) and a high frequency (HF) in the heartbeat, and it is known that a ratio LH/HF decreases when a human is comfortable. The LH/HF can also be obtained from the pulse. In addition, when a human is fatigued or discomfort, in general, breathing and blinking increase.

FIG. 7 is a diagram showing an example in which an algorithm that the vehicle control device 20 of the embodiment follows, is constructed by reinforcement learning.

As shown in FIG. 7, in the reinforcement learning of the actor-critic scheme, an environment 90 in which an agent 80 who is a decision maker performs decision making and learning is set. In the environment 90, an actor 82, which is also referred to as an action device, selects and executes an action based on a policy. A critic 81, which is also referred to as an evaluator, evaluates the action taken by the actor 82 based on a state obtained from the environment 90 and a reward, and notifies the actor 82 of the evaluation. The actor 82 updates the policy based on the evaluation. By repeating these cycles, an optimal policy is obtained.

When the algorithm that the vehicle control device 20 follows, is constructed, a state x(t) can be determined as the heartbeat, breathing, pulse, and blinking obtained from the captured image of the inner camera 14 and the substantial vibration applied to each part of the occupant obtained from the inner camera 14 and the outer camera 16.

For example, a reward function r(t) can be obtained by scoring the states such as comfort or discomfort and a fatigue degree of the occupant derived from indexes of the heartbeat, breathing, pulse, blinking, and the like shown in FIG. 6. Such scoring can be performed, for example, by deriving, by an experimental formula, a relationship between a state such as comfort or discomfort and a fatigue degree of the occupant and a secretion amount of dopamine, serotonin, and the like capable of estimating the state of the occupant.

The environment 90 in which the actor 82 executes an action can be determined as the vibration control system 40, the rolling control system 50, and the steering system 60.

With the above setting, the actor 82 selects an action u(t) while improving a policy function μ(x) in order to minimize a temporal difference (TD) error between a target value of a reward obtained from a value function V(x) and a current state and maximize a reward obtained by a state quantity.

By repeating the reinforcement learning as described above for a plurality of states x(t) in which attributes such as the gender, age, and physique of the occupant and body parts such as the head, chest, abdomen, and leg of the occupant are combined, it is possible to construct a trained model capable of executing appropriate vibration control for each attribute and each body part of the occupant. According to such a trained model, since the state x(t) also takes into account the state quantity capable of estimating a fatigue degree and a discomfort degree of the occupant, such as the heartbeat, breathing, pulse, and blinking of the occupant, it is possible to optimize the vibration control in consideration of such a state of the occupant.

By installing a program in which the trained model for each attribute and each body part of the occupant constructed as described above is incorporated as an algorithm, it is possible to cause the vehicle control device 20 to perform the complicated control as described above.

By determining a combination of the attributes such as the gender, age, and physique of the occupant and the body parts such as the head, chest, abdomen, and leg of the occupant as the state x(t) and repeating the reinforcement learning, vibration characteristics such as a discomfort vibration frequency and a comfortable vibration frequency are obtained for each attribute and each body part of the occupant. Vibration characteristic data acquired by such reinforcement learning and given to the vehicle control device 20 in advance is shown in FIG. 8.

FIG. 8 is a diagram showing an example of the vibration characteristic data given in advance to the vehicle control device 20 according to the embodiment.

As shown in FIG. 8, the vehicle control device 20 according to the embodiment holds data of different vibration characteristics A to P depending on combinations of the attributes such as the gender and age of the occupant and the body parts such as the head, chest, abdomen, and leg of the occupant. As described above, the signal generation unit 203 of the vehicle control device 20 generates a signal capable of performing appropriate vibration control for each attribute and each body part of each occupant with reference to such vibration characteristic data.

The signal generation unit 203 may reflect a physique difference of the occupant in the vibration characteristics A to L by, for example, multiplying the vibration characteristics A to L of adults other than infants by a predetermined coefficient according to the physique of the occupant indicated by a body mass index (BMI) and the like as one of the attributes of the occupant.

Processing Example of Vehicle Control Device

Figure 9:
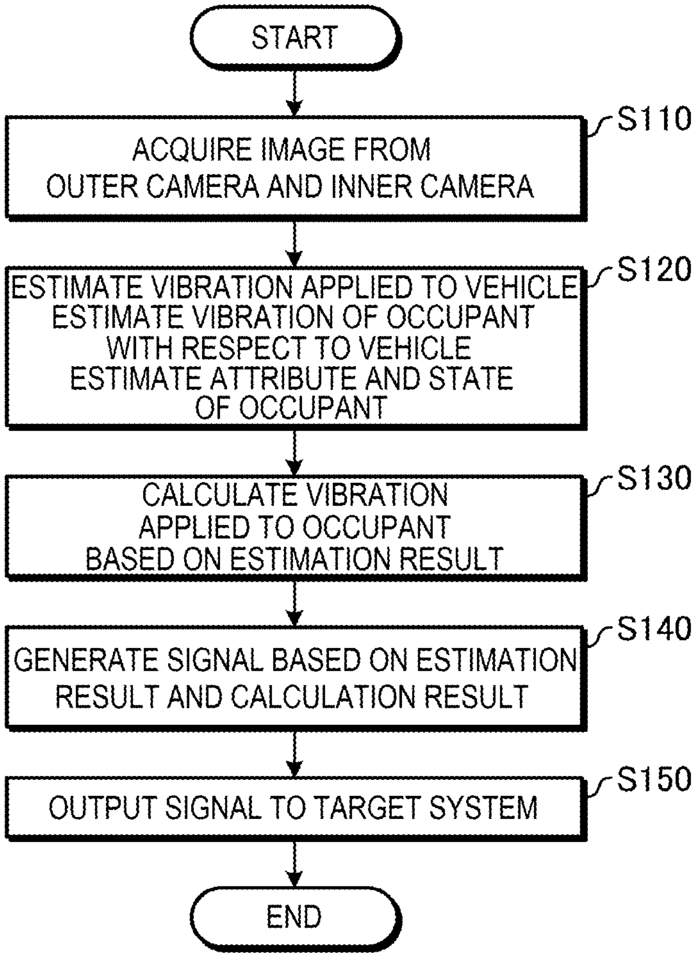
FIG. 9 is a flow diagram showing an example of a procedure of vehicle control processing performed by the vehicle control device according to the embodiment.

Next, an example of vehicle control processing performed by the vehicle control device 20 according to the embodiment will be described with reference to FIG. 9. FIG. 9 is a flow diagram showing an example of a procedure of the vehicle control processing performed by the vehicle control device 20 according to the embodiment.

As shown in FIG. 9, the acquisition unit 204 of the vehicle control device 20 acquires a surrounding image obtained by imaging the surrounding of the vehicle 10 from the outer camera 16, and acquires an occupant image obtained by imaging an occupant in the vehicle compartment from the inner camera 14 (step S110).

The vehicle state estimation unit 205 estimates, based on the surrounding image from the outer camera 16, vibration applied to the vehicle 10 due to undulation, a step, and the like of a road surface. The occupant state estimation unit 206 estimates vibration of parts such as the head, chest, abdomen, and leg of the occupant with respect to the vehicle 10 based on the occupant image from the inner camera 14. The occupant state estimation unit 206 estimates attributes such as the gender, age, and physique of the occupant in the vehicle compartment. The occupant state estimation unit 206 detects the heartbeat, breathing, pulse, blinking, and the like of the occupant, and estimates a state such as the fatigue degree and the discomfort degree of the occupant based on these (step S120).

The vibration calculation unit 202 calculates vibration substantially applied to each body part of the occupant based on the vibration applied to the vehicle 10 estimated by the vehicle state estimation unit 205 and the vibration of the occupant with respect to the vehicle 10 estimated by the occupant state estimation unit 206 (step S130).

The signal generation unit 203 generates a signal for controlling at least one of the vibration control system 40, the rolling control system 50, and the steering system 60 to prevent the vibration that causes the occupant to feel discomfort while referring to the vibration characteristic data based on the attribute and the state of the occupant estimated by the occupant state estimation unit 206 and the vibration applied to the occupant calculated by the vibration calculation unit 202 (step S140).

The output unit 207 outputs the signal generated by the signal generation unit 203 to each of the vibration control system 40, the rolling control system 50, and the steering system 60 as a target (step S150).

Accordingly, the vehicle control processing performed by the vehicle control device 20 according to the embodiment ends.

Overview

In order to prevent vibration of a vehicle, a technique of estimating a state quantity such as an acceleration applied to an occupant using an acceleration sensor provided in the vehicle is known. There is also a technique of estimating a state quantity of an occupant using an inner camera as in the technique of PTL 1 described above.

However, as described above, an in-vehicle acceleration sensor is generally fixed to a vehicle body in a form having rigidity, and it is difficult to accurately estimate the state quantity of the occupant seated on a seat including a spring. When it is conceivable to separately add an acceleration sensor for an occupant, the number of vehicle parts increases, and the cost increases.

As described above, since the inner camera is also fixed to the vehicle body and vibrates in synchronization with the vehicle, only the vibration based on the vehicle in which the vibration of the vehicle is not added can be detected from the image of the inner camera among the vibration applied to the occupant.

According to the vehicle control device 20 of the embodiment, the vibration applied to the vehicle 10 is estimated based on the surrounding image from the outer camera 16, and the vibration includes at least a vertical component. Based on the occupant image from the inner camera 14, the vibration of the occupant with respect to the vehicle 10 is estimated, and the vibration includes at least a vertical component. The vibration applied to the occupant is calculated by adding the vibration of the occupant with respect to the vehicle 10 to the vibration applied to the vehicle 10.

Accordingly, the vibration of the occupant to which the vibration of the vehicle 10 is added can be estimated with high accuracy using only a camera image. Therefore, it is not necessary to newly attach expensive parts such as an acceleration sensor for an occupant to the vehicle 10. Therefore, the vibration applied to the occupant can be estimated using a simple configuration, and the vibration that causes the occupant to feel discomfort can be prevented.

According to the vehicle control device 20 of the embodiment, the occupant state estimation unit 206 estimates the vibration of the occupant with respect to the vehicle 10 and estimates an attribute of the occupant based on the body parts including at least one of the face and the torso of the occupant included in the occupant image. Since the attribute of the occupant is estimated based on the image of the inner camera 14 and used for vibration control, finer vibration control can be performed according to the attribute of each occupant, and a comfort level of more occupants or individual occupants can be improved.

According to the vehicle control device 20 of the embodiment, the occupant state estimation unit 206 estimates the vibration of the occupant with respect to the vehicle 10 and estimates a state including the vital signs of the occupant based on at least one of a position of the occupant in the vehicle 10 and the body parts of the occupant included in the occupant image. Since the state of the occupant is estimated based on the image of the inner camera 14 and used for the vibration control, the finer vibration control can be performed according to the state of each occupant, and the comfort level of more occupants or individual occupants can be improved.

According to the vehicle control device 20 of the embodiment, at least one of the vehicle state estimation unit 205, the occupant state estimation unit 206, and the signal generation unit 203 is constructed using machine learning, and operates based on a trained model that outputs a signal of the vibration control when receiving information obtained from the surrounding image and the occupant image. Accordingly, by incorporating the trained model constructed using the machine learning into the program as an algorithm, it is possible to perform various types of complicated control with high accuracy as described above.

Modification

Next, a vehicle control device according to a modification of the embodiment will be described with reference to FIGS.

10 to 12. The vehicle control device according to the modification is different from the above-described embodiment in that an external request from an occupant and the like can be received.

In the following description, FIG. 4 of the embodiment is used, and components corresponding to various components of the vehicle control device 20 according to the embodiment are denoted by the same reference numerals.

Figure 10:
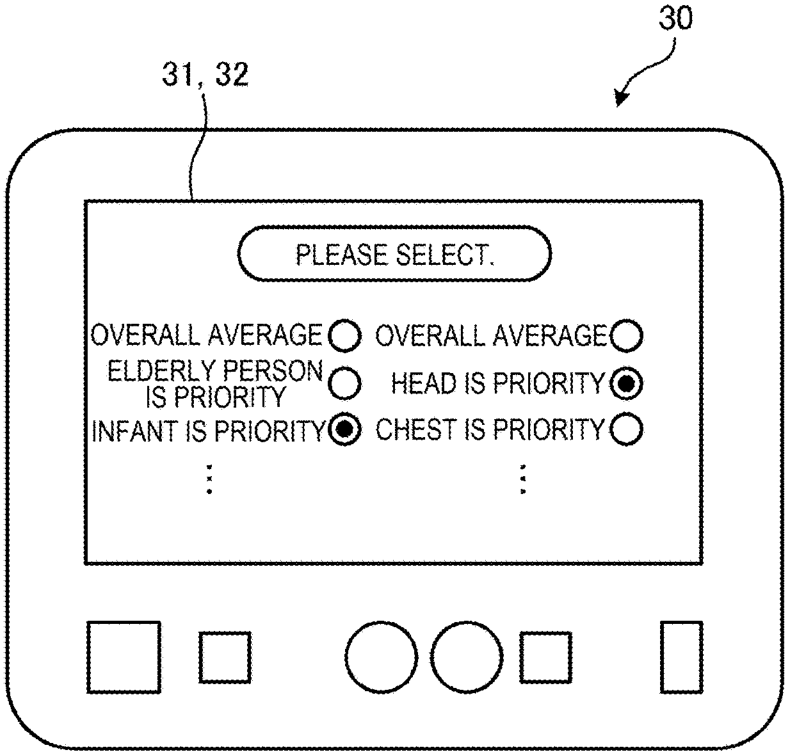
FIG. 10 is a diagram showing an example of an external request input screen displayed on a monitor device of a vehicle control device according to a modification of the embodiment.
Figure 11:
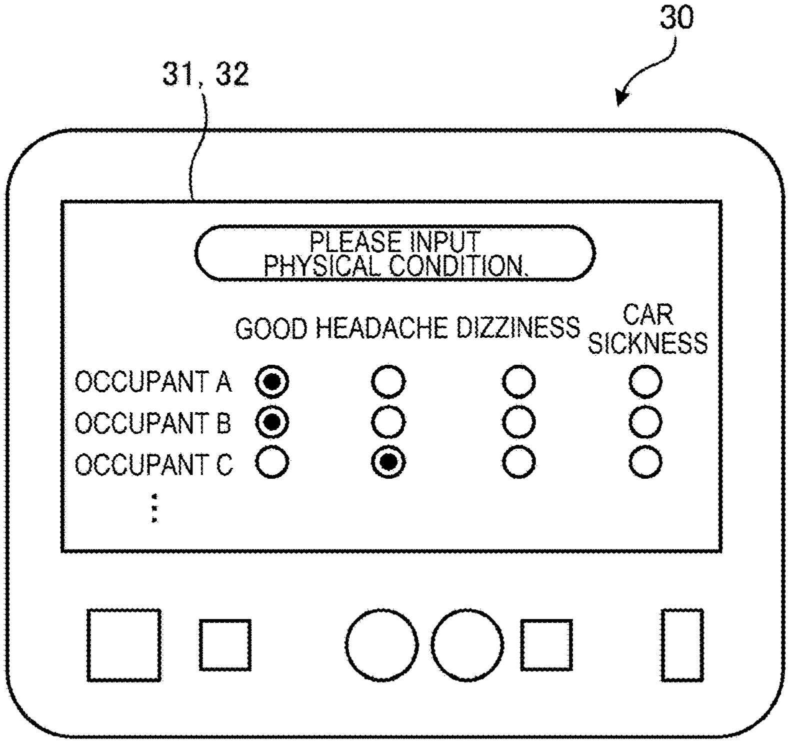
FIG. 11 is a diagram showing an example of the external request input screen displayed on the monitor device of the vehicle control device according to the modification of the embodiment.

FIGS. 10 and 11 are diagrams showing an example of an external request input screen displayed on the monitor device 30 of the vehicle control device according to the modification of the embodiment. As shown in FIGS. 10 and 11, the display control unit 201 of the vehicle control device can cause the monitor device 30 to display the external request input screen according to a screen operation by the occupant and the like.

In the example of FIG. 10, the external request input screen is a screen on which an item to be prioritized can be selected as an external request among, for example, attributes of the occupant and body parts of the occupant.

From an external input screen displayed on the monitor device 30, the occupant and the like can select, for example, an attribute to be prioritized, such as an elderly person or an infant, among the attributes of the occupant. From the external input screen of the monitor device 30, the occupant and the like can select, for example, a part to be prioritized, such as a head or a chest, among the body parts of the occupant.

The vehicle control device according to the modification performs control so as to preferentially prevent vibration that causes the occupant to feel discomfort for the occupant having a predetermined attribute or a predetermined body part of the occupant according to a priority order selected by the occupant and the like.

When there is no item to be prioritized in the attributes, the body parts, and the like of the occupant, the occupant can select an overall average of these items. When an input operation of the priority order by the occupant and the like is not particularly performed, the vehicle control device may be set to perform vibration control according to the overall average as an initial value.

In the example of FIG. 11, the external request input screen is, for example, a screen on which an item related to a state such as a physical condition of each occupant can be selected as the external request.

From the external input screen displayed on the monitor device 30, the occupant and the like can input, for example, whether there is a good or bad physical condition and a specific disorder such as headache, dizziness, or car sickness for each occupant A, B, C, and the like.

The vehicle control device according to the modification performs control so as to preferentially prevent vibration that causes the occupant to feel discomfort for the occupant who needs care more according to the state of each occupant selected by the occupant and the like.

Figure 12:
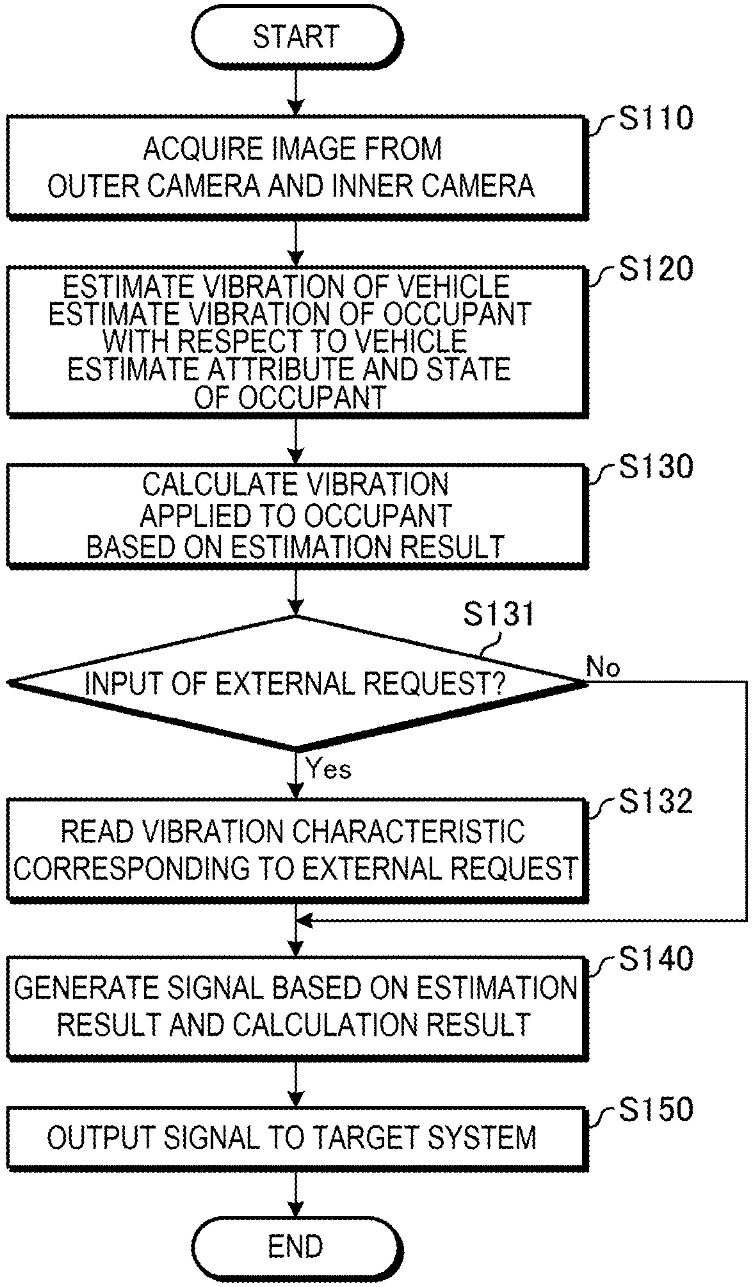
FIG. 12 is a flow diagram showing an example of a procedure of vehicle control processing performed by the vehicle control device according to the modification of the embodiment.

FIG. 12 is a flow diagram showing an example of a procedure of vehicle control processing performed by the vehicle control device according to the modification of the embodiment.

Prior to the processing of FIG. 12, the occupant and the like can input various external requests from the monitor device 30 and the like, and when the above-described display control unit 201 receives the input of the external request, input information is stored in a memory and the like of the vehicle control device.

Among the processing shown in FIG. 12, the processing of steps S110 to S130 are the same as the processing of steps S110 to S130 shown in FIG. 9 of the above-described embodiment.

That is, based on images acquired from the inner camera 14 and the outer camera 16 (step S110), vibration applied to the vehicle 10 and vibration of the occupant with respect to the vehicle 10 are estimated, and the attribute and the state of the occupant are estimated (step S120). From these estimation results, vibration substantially applied to the occupant is calculated (step S130).

In the vehicle control device according to the modification, the signal generation unit 203 refers to a memory and the like of the vehicle control device to check whether there is an input of an external request by the occupant and the like (step S131). When an external request such as an occupant having a predetermined attribute, a predetermined body part of the occupant, or a state related to a physical condition and the like of each occupant is input (step S131: Yes), the signal generation unit 203 refers to, for example, the vibration characteristic data shown in FIG. 8 described above to select a vibration characteristic suitable for the attribute, the body part, or the state according to the external request (step S132).

When the external request is not input by the occupant and the like (step S131: No), the signal generation unit 203 skips the processing of step S132. Accordingly, the vibration control by the vehicle control device of the modification is performed according to an initial setting such as an overall average.

Among the processing shown in FIG. 12, the subsequent processing of steps S140 to S150 are also similar to the processing of steps S140 to S150 shown in FIG. 9 of the above-described embodiment.

That is, based on an estimation result by the occupant state estimation unit 206 and a calculation result by the vibration calculation unit 202, and based on the vibration characteristic corresponding to the external request when there is the external request, a signal of the vibration control is generated (step S140), and is output to the vibration control system 40, the rolling control system 50, and the steering system 60 (step S150).

As described above, the vehicle control processing by the vehicle control device according to the modification ends.

The vehicle control device according to the modification further includes the input unit 32 that receives an input of an external request including at least one of a priority order for each attribute of an occupant and a priority order for each body part of the occupant, and changes a weighting of information obtained from an occupant image, such as information related to the attribute, the body part, and the like of the occupant, according to the received external request. Accordingly, it is possible to perform finer vibration control according to the request of the occupant, and it is possible to improve a comfort level of more occupants or individual occupants.

In the above-described embodiment and modification, the vehicle control system 200 includes the outer cameras 16 provided on an exterior of the vehicle 10 and the inner cameras 14 provided in the vehicle compartment. However, similarly to the inner camera 14, a camera that captures a surrounding image of the vehicle 10 may be provided in the vehicle compartment.

At least one camera including a wide-angle lens or a fisheye lens may be disposed in, for example, the vehicle compartment, and an image in which both the surrounding of the vehicle 10 and the occupant in the vehicle compartment are reflected may be captured by the one camera. In this case, the vehicle state estimation unit 205 and the occupant state estimation unit 206 described above may estimate the vibration applied to the vehicle 10, the vibration of the occupant with respect to the vehicle 10, the attribute of the occupant, other states, and the like based on the same images.

Accordingly, the number of in-vehicle cameras can be reduced, and the cost can be further reduced.

Alternatively, images may be obtained for each occupant or for each predetermined body part of the occupant by, for example, increasing the number of inner cameras 14 that capture images of the occupant, and the occupant state estimation unit 206 may perform various types of estimation as described above based on the images.

Accordingly, it is possible to more accurately grasp the attribute, the body part, the state, and the like of each occupant, and more appropriate vibration control is possible.

Summary of Embodiments

A vehicle control device (20) of the embodiment includes at least the following configuration.

That is, the vehicle control device (20) according to the embodiment includes:

- an acquisition unit (204) configured to acquire, from a camera (14, 16) that images a surrounding of a vehicle (10) and inside of a vehicle compartment, a surrounding image of the vehicle (10) and an image of an occupant in the vehicle compartment;
- a first estimation unit (205) configured to estimate vibration applied to the vehicle (10) based on the surrounding image, the vibration including at least a vertical component;
- a second estimation unit (206) configured to estimate vibration of the occupant with respect to the vehicle (10) based on the image of the occupant, the vibration including at least a vertical component;
- a calculation unit (202) configured to calculate vibration applied to the occupant by adding the vibration of the occupant with respect to the vehicle (10) to the vibration applied to the vehicle (10); and
- a generation unit (203) configured to generate a signal to be output to a vibration control device (40, 50) that controls the vibration applied to the occupant, the signal being based on the vibration applied to the occupant.

According to this configuration, the vibration applied to the occupant can be estimated using a simple configuration, and vibration that causes the occupant to feel discomfort can be prevented.

In the above-described vehicle control device (20), the second estimation unit (206)

estimates the vibration of the occupant with respect to the vehicle (10) and estimates an attribute of the occupant based on a body part including at least one of a face and a torso of the occupant included in the image of the occupant, and the generation unit (203)

generates a signal based on the attribute of the occupant in addition to the vibration applied to the occupant.

According to this configuration, it is possible to perform vibration control according to the attribute of the occupant, although vibration characteristics that cause the occupant to feel discomfort differ depending on the attribute of the occupant.

The above-described vehicle control device (20) further includes:

- an input unit (32) configured to receive an input of an external request including at least one of a priority order for each attribute of the occupant and a priority order for each body part of the occupant, and
- the generation unit (203) changes weighting of information obtained from the image of the occupant in response to the external request.

According to this configuration, the occupant can cause the vehicle control device (20) to perform desired control by inputting the external request.

In the above-described vehicle control device (20), the second estimation unit (206)

estimates the vibration of the occupant with respect to the vehicle and estimates a state including a vital sign of the occupant based on at least one of a position of the occupant in the vehicle and the body part of the occupant included in the image of the occupant, and the generation unit (203)

generates a signal based on the state of the occupant in addition to the vibration applied to the occupant.

According to this configuration, it is possible to perform vibration control according to the state of the occupant, although vibration characteristics that cause the occupant to feel discomfort differ depending on the state of the occupant.

In the above-described vehicle control device (20), at least one of the first and second estimation units (205, 206) and the generation unit (203) operates based on a trained model that is constructed using machine learning and that outputs the signal when receiving information obtained from the surrounding image and the image of the occupant.

According to this configuration, since the trained model constructed using the machine learning is used, vibration control can be performed with high accuracy.

REFERENCE SIGNS LIST

10: vehicle
14: inner camera
16: outer camera
20: vehicle control device
30: monitor device
31: display unit
32: input unit
40: vibration suppression system
50: rolling suppression system
60: steering system
201: display control unit
202: vibration calculation unit
203: signal generation unit
204: acquisition unit
205: vehicle state estimation unit
206: occupant state estimation unit
207: output unit

The invention claimed is:

1. A vehicle control device comprising:

an acquisition unit configured to acquire, from a camera that images a surrounding of a vehicle and inside of a vehicle compartment, a surrounding image of the vehicle and an image of an occupant in the vehicle compartment;

a first estimation unit configured to estimate vibration applied to the vehicle based on the surrounding image, the vibration including at least a vertical component;

a second estimation unit configured to estimate vibration of the occupant with respect to the vehicle based on the image of the occupant, the vibration including at least a vertical component;

a calculation unit configured to calculate vibration applied to the occupant by adding the vibration of the occupant with respect to the vehicle to the vibration applied to the vehicle; and a generation unit configured to generate a signal to be output to a vibration control device that controls the vibration applied to the occupant, the signal being based on the vibration applied to the occupant.

2. The vehicle control device according to claim 1, wherein the second estimation unit estimates the vibration of the occupant with respect to the vehicle and estimates an attribute of the occupant based on a body part including at least one of a face and a torso of the occupant included in the image of the occupant, and the generation unit generates a signal based on the attribute of the occupant in addition to the vibration applied to the occupant.

3. The vehicle control device according to claim 1, wherein the second estimation unit estimates the vibration of the occupant with respect to the vehicle and estimates a state including a vital sign of the occupant based on at least one of a position of the occupant in the vehicle and the body part of the occupant included in the image of the occupant, and the generation unit generates a signal based on the state of the occupant in addition to the vibration applied to the occupant.

4. The vehicle control device according to claim 2, wherein at least one of the first and second estimation units and the generation unit operates based on a trained model that is constructed using machine learning and that outputs the signal when receiving information obtained from the surrounding image and the image of the occupant.

* * * * *